United States Patent
Park et al.

(10) Patent No.: US 10,038,912 B2
(45) Date of Patent: Jul. 31, 2018

(54) METHOD AND AN APPARATUS FOR PROCESSING A VIDEO SIGNAL

(71) Applicant: LG ELECTRONICS INC., Seoul (KR)

(72) Inventors: Seung Wook Park, Seoul (KR); Jung Sun Kim, Seoul (KR); Young Hee Choi, Seoul (KR); Byeong Moon Jeon, Seoul (KR); Joon Young Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/660,760

(22) Filed: Jul. 26, 2017

(65) Prior Publication Data

US 2017/0324972 A1    Nov. 9, 2017

Related U.S. Application Data

(63) Continuation of application No. 14/807,968, filed on Jul. 24, 2015, which is a continuation of application
(Continued)

(30) Foreign Application Priority Data

Oct. 6, 2009    (KR) .................. 10-2009-0094490

(51) Int. Cl.
*H04N 11/02*    (2006.01)
*H04N 19/51*    (2014.01)
(Continued)

(52) U.S. Cl.
CPC .......... *H04N 19/51* (2014.11); *H04N 19/107* (2014.11); *H04N 19/11* (2014.11); *H04N 19/172* (2014.11);
(Continued)

(58) Field of Classification Search
CPC ...................................................... H04N 19/51
(Continued)

(56) References Cited

U.S. PATENT DOCUMENTS

| 5,610,659 A * | 3/1997 | Maturi ................. H04N 19/176 375/240.01 |
| 2004/0233989 A1* | 11/2004 | Kobayashi ........... H04N 19/105 375/240.16 |

(Continued)

FOREIGN PATENT DOCUMENTS

| EP | 1 429 564 A1 | 6/2004 |
| WO | 2008027192 A2 | 3/2008 |

OTHER PUBLICATIONS

European Search Report dated Jul. 20, 2010, for Application No. 09012636, 11 pages.
(Continued)

*Primary Examiner* — Leron Beck
(74) *Attorney, Agent, or Firm* — Dentons US LLP

(57) ABSTRACT

The present invention relates to a video signal decoding method for adding an intra prediction mode as a sub-macroblock type to prediction of a macroblock in coding a video signal. Some implementations may include obtaining a macroblock type, when a macroblock includes the intra prediction coded sub-macroblock and the inter prediction coded sub-macroblock based on the macroblock type, obtaining prediction mode flag information indicating whether the sub-macroblock is the intra prediction coded or the inter prediction coded, and obtaining a prediction value of the sub-macroblock. Accordingly, implementations disclosed herein may raise coding efficiency of video signal by adding an intra prediction mode as a sub-macroblock type in predicting a macroblock.

18 Claims, 23 Drawing Sheets

Related U.S. Application Data

No. 14/042,912, filed on Oct. 1, 2013, now Pat. No. 9,167,249, which is a continuation of application No. 12/574,313, filed on Oct. 6, 2009, now Pat. No. 8,879,637.

(60) Provisional application No. 61/223,073, filed on Jul. 6, 2009, provisional application No. 61/177,638, filed on May 12, 2009, provisional application No. 61/156,536, filed on Mar. 1, 2009, provisional application No. 61/143,821, filed on Jan. 12, 2009, provisional application No. 61/143,826, filed on Jan. 12, 2009, provisional application No. 61/117,958, filed on Nov. 26, 2008, provisional application No. 61/103,219, filed on Oct. 6, 2008.

(51) Int. Cl.
  *H04N 19/86* (2014.01)
  *H04N 19/44* (2014.01)
  *H04N 19/107* (2014.01)
  *H04N 19/11* (2014.01)
  *H04N 19/18* (2014.01)
  *H04N 19/172* (2014.01)
  *H04N 19/176* (2014.01)
  *H04N 19/61* (2014.01)

(52) U.S. Cl.
  CPC .......... *H04N 19/176* (2014.11); *H04N 19/18* (2014.11); *H04N 19/44* (2014.11); *H04N 19/61* (2014.11); *H04N 19/86* (2014.11)

(58) Field of Classification Search
  USPC ........................................ 375/240.01–240.29
  See application file for complete search history.

(56) References Cited

U.S. PATENT DOCUMENTS

| | | | |
|---|---|---|---|
| 2004/0234144 A1* | 11/2004 | Sugimoto | H04N 19/176 382/239 |
| 2005/0013373 A1* | 1/2005 | Lin | H04N 19/70 375/240.18 |
| 2005/0276493 A1 | 12/2005 | Xin et al. | |
| 2006/0104357 A1* | 5/2006 | Burazerovic | H04N 19/70 375/240.15 |
| 2006/0202872 A1* | 9/2006 | Kobayashi | H03M 7/4006 341/50 |
| 2007/0036224 A1 | 2/2007 | Srinivasan et al. | |
| 2008/0056355 A1 | 3/2008 | Guo et al. | |
| 2008/0123977 A1* | 5/2008 | Moriya | H04N 19/176 382/238 |
| 2008/0260027 A1 | 10/2008 | Karczewicz | |
| 2010/0195722 A1* | 8/2010 | Boon | H04N 19/11 375/240.12 |

OTHER PUBLICATIONS

PCT International Search Report for Application No. PCT/KR2009/005700 dated May 19, 2010, 3 pages.

VCEG: "1-1.26L Test Model Long-Term No. 7" ITU Study Group 16—Video Coding Experts Group Iso/Iec MPEG & ITU-T VCEG (ISO/IEC JTC1/SC29/VVG11 and ITU-T SG16 Q6), No. VCEG-M81d0, May 11, 2001, XP030003250 (36 pages).

JvtiSullivan et al: "Draft ITU-T H.264:2004 Amd. 1 /\ISO/IEC 14496-10: 2004/FDAM1 AVC FRExt" ITU Study Group 16—Video Coding Experts Group—Video Coding Experts Group—ISO/IEC MPEG & ITU-T VCEG (ISO/IEC JTC1/SC29WG11 and ITU-T SG16 06), No. JVT-L047d12, Jul. 23, 2004, XP030005899 (138 pages).

S. Adachi et al.: "Core experiments Description on Improved Macro block Prediction modes." ITU Study Group 16—Video Coding Experts Group—ISO/IEC MPEG & ITU-T VCEG (ISOIIEC JTC1/SC29/WG11 and ITU-T SG16 06), No. VCEG-061, Jan. 18, 2002, XP030003394 (10 pages).

Siwei Ma et al: "High-definition Video Coding with Super-macroblocks" proceedings of the international society for optical engineering, Sep. 11, 2007, SPIE, USA, vol. 6508, No. 650816, Jan. 29, 2007, pp. 1-12, XP002538135 (12 pages).

Sim D et al: "Unidirectional 4x4 intra prediction" 36. VCEG Meeting; Aug. 10, 2008-Oct. 10, 2008; San Diego, US; (Vido Coding Experts Group of ITU-T SG. 16), Oct. 6, 2008, XP030003638 (10 pages).

VCEG: wftp3.itu.int/av-archivideo-site/0810_sanr[Online] XP002588470 (1 page).

European Search Report for Application No. 09012636.8 dated Jul. 20, 2010 (11 pages).

\* cited by examiner

FIG. 4
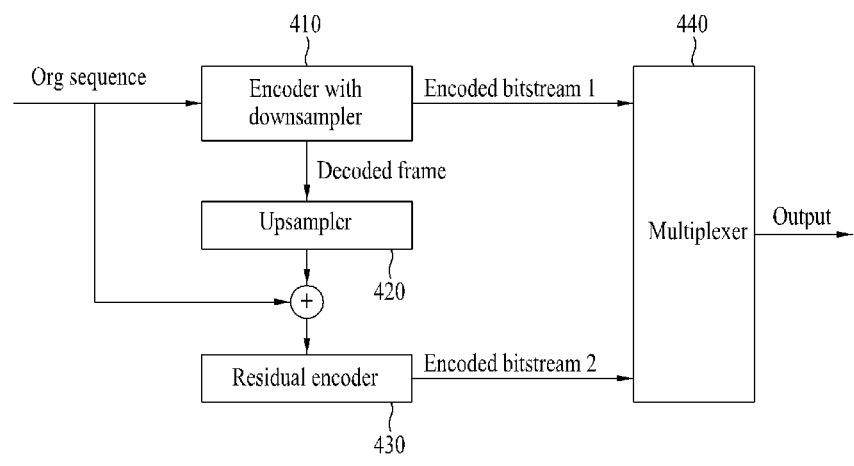
(a)
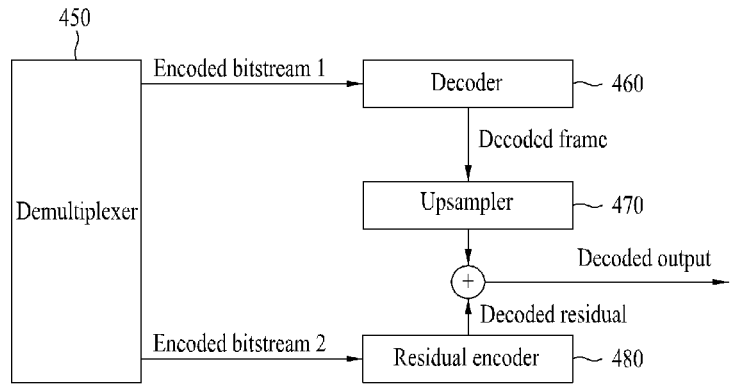
(b)

FIG. 7
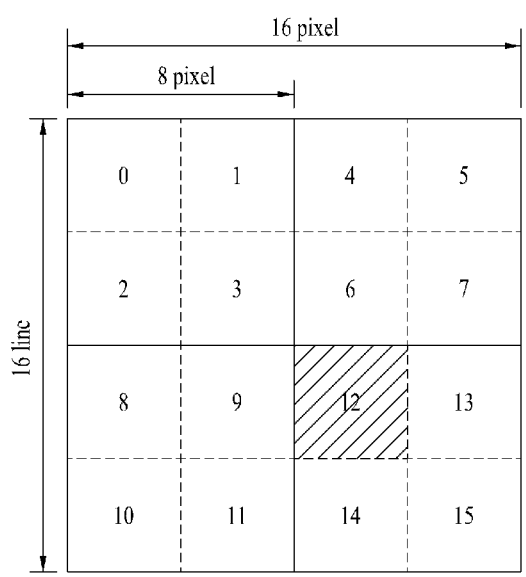
(a)
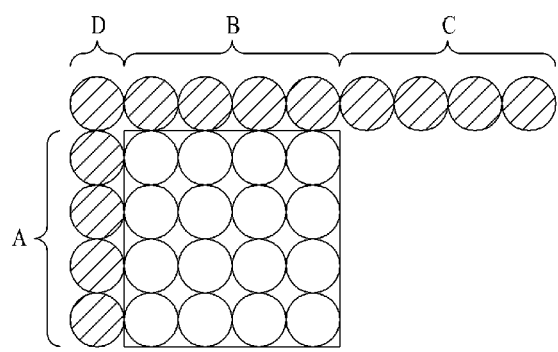
(b)

FIG. 11
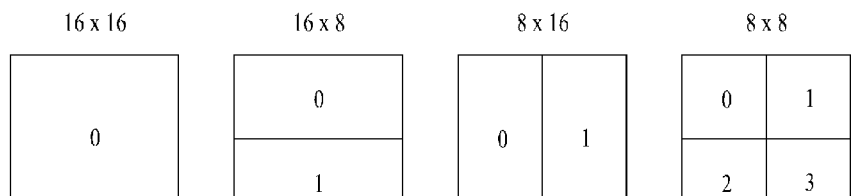
(a) MB type
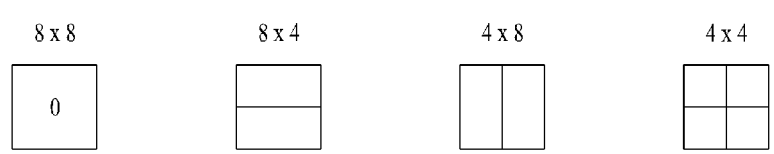
(b) Sub_MB type

FIG. 14

```
sub_mb_pred( mb_type ) {
  for( mbPartIdx = 0; mbPartIdx < 4; mbPartIdx++ )
    sub_mb_type[ mbPartIdx ]
  for( mbPartIdx = 0; mbPartIdx < 4; mbPartIdx++ )
    if( ( num_ref_idx_l0_active_minus1 > 0 || mb_field_decoding_flag ) &&
        mb_type != P_8x8ref0 &&
        sub_mb_type[ mbPartIdx ] != B_Direct_8x8 &&
        SubMbPredMode( sub_mb_type[ mbPartIdx ] ) != Pred_L1 )
      ref_idx_l0 [ mbPartIdx ]
  for( mbPartIdx = 0; mbPartIdx < 4; mbPartIdx++ )
    if( (num_ref_idx_l1_active_minus1 > 0 | mb_field_decoding_flag ) &&
        sub_mb_type[ mbPartIdx ] != B_Direct_8x8 &&
        SubMbPredMode( sub_mb_type[ mbPartIdx ] ) != Pred_L0 )
      ref_idx_l1 [ mbPartIdx ]
  for( mbPartIdx = 0; mbPartIdx < 4; mbPartIdx++ )
    if( sub_mb_type[?mbPartIdx?] != B_Direct_8x8 &&
        SubMbPredMode( sub_mb_type[ mbPartIdx ] ) != Pred_L1 )
      for( subMbPartIdx = 0;
           subMbPartIdx < NumSubMbPart( sub_mb_type[ mbPartIdx ] );
           subMbPartIdx++)
        for( compIdx = 0; compIdx < 2; compIdx++ )
          mvd_l0 [ mbPartIdx ][ subMbPartIdx ][ compIdx ]
  for( mbPartIdx = 0; mbPartIdx < 4; mbPartIdx++ )
    if( sub_mb_type[ mbPartIdx ] != B_Direct_8x8 &&
        SubMbPredMode( sub_mb_type[ mbPartIdx ] ) != Pred_L0 )
      for( subMbPartIdx = 0;
           subMbPartIdx < NumSubMbPart( sub_mb_type[ mbPartIdx ] );
           subMbPartIdx++)
        for( compIdx = 0; compIdx < 2; compIdx++ )
          mvd_l1 [ mbPartIdx ][ subMbPartIdx ][ compIdx ]
}
```

(a)

```
sub_mb_pred( mb_type ) {
  for( mbPartIdx = 0; mbPartIdx < 4; mbPartIdx++ )
    sub_mb_type[ mbPartIdx ]
  for( mbPartIdx = 0; mbPartIdx < 4; mbPartIdx++ )
    if( ( num_ref_idx_l0_active_minus1 > 0 || mb_field_decoding_flag ) &&
        mb_type != P_8x8ref0 &&
        sub_mb_type[ mbPartIdx ] != B_Direct_8x8 &&
        SubMbPredMode( sub_mb_type[ mbPartIdx ] ) != Pred_L1 );
      for( subMbPartIdx = 0;
           subMbPartIdx < NumSubMbPart(sub_mb_type[ mbPartIdx ] );
           subMbPartIdx++)
        ref_idx_l0 [ mbPartIdx ][ subMbPartIdx ]
  for( mbPartIdx = 0; mbPartIdx < 4; mbPartIdx++ )
    if( (num_ref_idx_l1_active_minus1 > 0 | mb_field_decoding_flag ) &&
        sub_mb_type[ mbPartIdx ] != B_Direct_8x8 &&
        SubMbPredMode( sub_mb_type[ mbPartIdx ] ) != Pred_L0 )
      for( subMbPartIdx = 0;
           subMbPartIdx < NumSubMbPart(sub_mb_type[ mbPartIdx ]);
           subMbPartIdx++);
        ref_idx_l1 [ mbPartIdx ][ subMbPartIdx ]
  for( mbPartIdx = 0; mbPartIdx < 4; mbPartIdx++ )
    if( sub_mb_type[?mbPartIdx?] != B_Direct_8x8 &&
        SubMbPredMode(sub_mb_type[mbPartIdx]) != Pred_L1 )
      for( subMbPartIdx = 0;
           subMbPartIdx < NumSubMbPart(sub_mb_type[mbPartIdx]);
           subMbPartIdx++)
        for( compIdx = 0; compIdx < 2; compIdx++ )
          mvd_l0 [mbPartIdx][subMbPartIdx][compIdx]
  for( mbPartIdx = 0; mbPartIdx < 4; mbPartIdx++ )
    if( sub_mb_type[mbPartIdx] != B_Direct_8x8 &&
        SubMbPredMode(sub_mb_type[mbPartIdx]) != Pred_L0 )
      for( subMbPartIdx = 0;
           subMbPartIdx < NumSubMbPart(sub_mb_type[mbPartIdx]);
           subMbPartIdx++)
        for( compIdx = 0; compIdx < 2; compIdx++ )
          mvd_l1 [mbPartIdx][subMbPartIdx][compIdx]
}
```

| sub_mb_type[mbPartIdx] | Name of sub_mb_type[mbPartIdx] | NumSubMbPart (sub_mb_type[mbPartIdx]) | SubMbPredMode (sub_mb_type[mbPartIdx]) | SubMbPartWidth (sub_mb_type[mbPartIdx]) | SubMbPartHeight (sub_mb_type[mbPartIdx]) |
|---|---|---|---|---|---|
| inferred | na | na | na | na | na |
| 0 | P L0 16 x 16 | 1 | Pred L0 | 16 | 16 |
| 1 | P L0 16 x 8 | 2 | Pred L0 | 16 | 8 |
| 2 | P L0 8 x 16 | 3 | Pred L0 | 8 | 16 |
| 3 | P L0 8 x 8 | 4 | Pred L0 | 8 | 8 |

(a)

| sub_mb_type[mbPartIdx] | Name of sub_mb_type[mbPartIdx] | NumSubMbPart (sub_mb_type[mbPartIdx]) | SubMbPredMode (sub_mb_type[mbPartIdx]) | SubMbPartWidth (sub_mb_type[mbPartIdx]) | SubMbPartHeight (sub_mb_type[mbPartIdx]) |
|---|---|---|---|---|---|
| inferred | mb_type | 4 | Direct | 8 | 8 |
| 0 | B Direct 16 x 16 | 4 | Direct | 8 | 8 |
| 1 | B L0 16 x 16 | 1 | Pred L0 | 16 | 16 |
| 2 | B L1 16 x 16 | 1 | Pred L1 | 16 | 16 |
| 3 | B Bi 16 x 16 | 1 | BiPred | 16 | 16 |
| 8 | B L0 16 x 8 | 2 | Pred L0 | 16 | 8 |
| 5 | B L0 8 x 16 | 2 | Pred L0 | 8 | 16 |
| 6 | B L1 16 x 8 | 2 | Pred L1 | 16 | 8 |
| 7 | B L1 8 x 16 | 2 | Pred L1 | 8 | 16 |
| 16 | B Bi 16 x 8 | 2 | BiPred | 16 | 8 |
| 9 | B Bi 8 x 16 | 2 | BiPred | 8 | 16 |
| 10 | B L0 8 x 8 | 4 | Pred L0 | 8 | 8 |
| 11 | B L1 8 x 8 | 4 | Pred L1 | 8 | 8 |
| 12 | B Bi 8 x 8 | 4 | BiPred | 8 | 8 |

(b)

FIG. 20
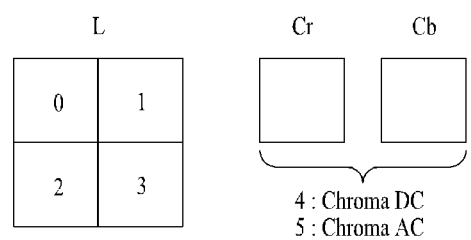
FIG. 21
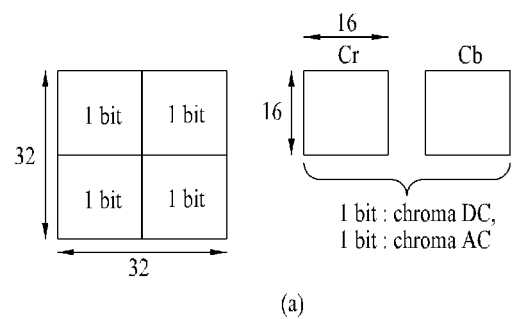
(a)
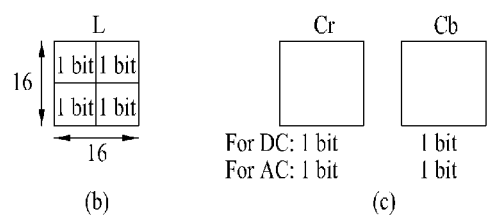
(b)  (c)

FIG. 22
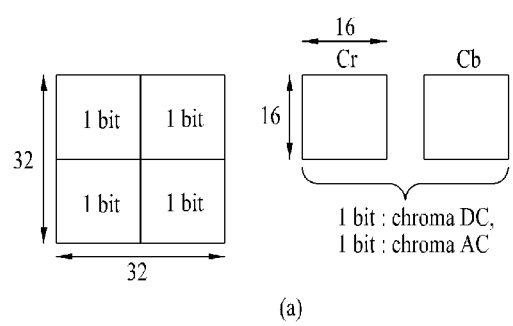
(a)
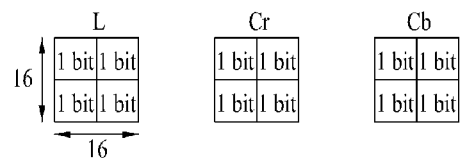
(b)

METHOD AND AN APPARATUS FOR PROCESSING A VIDEO SIGNAL

CROSS-REFERENCE TO RELATED APPLICATION

This application is a continuation of U.S. patent application Ser. No. 14/807,968, filed on Jul. 24, 2015, now allowed, which is a continuation of U.S. patent application Ser. No. 14/042,912, filed on Oct. 1, 2013, now U.S. Pat. No. 9,167,249, which is a continuation of U.S. patent application Ser. No. 12/574,313, filed on Oct. 6, 2009, now U.S. Pat. No. 8,879,637; which claims the benefit of U.S. Provisional Application No. 61/223,073, filed on Jul. 6, 2009; U.S. Provisional Application No. 61/177,638, filed on May 12, 2009, U.S. Provisional Application No. 61/156,536, filed on Mar. 1, 2009; U.S. Provisional Application No. 61/143,821, filed on Jan. 12, 2009; U.S. Provisional Application No. 61/143,826, filed on Jan. 12, 2009; U.S. Provisional Application No. 61/117,958, filed on Nov. 26, 2008; U.S. Provisional Application No. 61/103,219, filed on Oct. 6, 2008 and Korean Patent Application No. 10-2009-0094490, filed on Oct. 6, 2009 all of which are incorporated by reference in their entirety herein.

BACKGROUND OF THE INVENTION

Field of the Invention

The present invention relates to coding of a video signal.

Discussion of the Related Art

Generally, compression coding means a series of signal processing techniques for transferring digitalized information via a communication circuit or storing digitalized information in a format suitable for a storage medium. Targets of compression coding include audio, video, character, etc. In particular, a technique of performing compression coding on a sequence is called video sequence compression. Video sequence is generally characterized in having spatial redundancy and temporal redundancy.

However, in predicting a macroblock having a size of 32×32 greater than 16×16 or a size greater than 32×32, prediction efficiency may be lowered using an inter prediction mode as a sub-macroblock type despite that there is a space capable of using more macroblock types.

As one prediction scheme of inter prediction coding and intra prediction coding is used for prediction of a macroblock only, compression performance may be degraded.

In case that most of a video includes a flat region, if the video is coded with a down-sampled frame, coding efficiency may be raised. Since partial information is removed in a downsampling process, it is able to provide a sufficient gain at a high bit rate due to a loss of quality.

SUMMARY OF THE INVENTION

Accordingly, the present invention is directed to an apparatus for decoding a video signal and method thereof that substantially obviate one or more of the problems due to limitations and disadvantages of the related art.

An object of the present invention is to provide an apparatus for decoding a video signal and method thereof, by which coding efficiency of a video signal can be raised in a manner of adding an intra prediction mode as a sub-macroblock type in predicting a macroblock having a size of 32×32 greater than 16×16 or a size greater than 32×32.

Another object of the present invention is to provide an apparatus for decoding a video signal and method thereof, by which coding efficiency of a video signal can be raised by using both of inter prediction mode and intra prediction mode for one macroblock in predicting a macroblock having a size of 32×32 greater than 16×16 or a size greater than 32×32.

A further object of the present invention is to provide an apparatus for decoding a video signal and method thereof, by which a sufficient gain can be provided in a downsampling process in a manner of coding a residual between an original frame and an upsampled frame.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 schematically shows a decoder including a down-sampled frame decoding unit (a) and a residual data decoding unit (b) according to an embodiment of the present invention;

FIG. 7 shows intra prediction modes used for 4×4 block in H.264/AVC;

FIG. 11 shows a motion compensation block size in H.264/AVC;

FIG. 14 shows a syntax structure indicating a reference picture index assigning method in 32×32 macroblock according to an embodiment of the present invention;

FIG. 15 shows sub-macroblock types of a P macroblock (a) and a B macroblock (b) in 32×32 macroblock size according to an embodiment of the present invention;

FIG. 20 shows a method of displaying a coded block pattern in H.264/AVC;

FIG. 21 shows a method of displaying a coded block pattern hierarchically in 32×32 block according to an embodiment of the present invention;

FIG. 22 shows a method of displaying a coded block pattern in 32×32 macroblock according to another embodiment of the present invention.

DETAILED DESCRIPTION OF THE INVENTION

Figure 1:
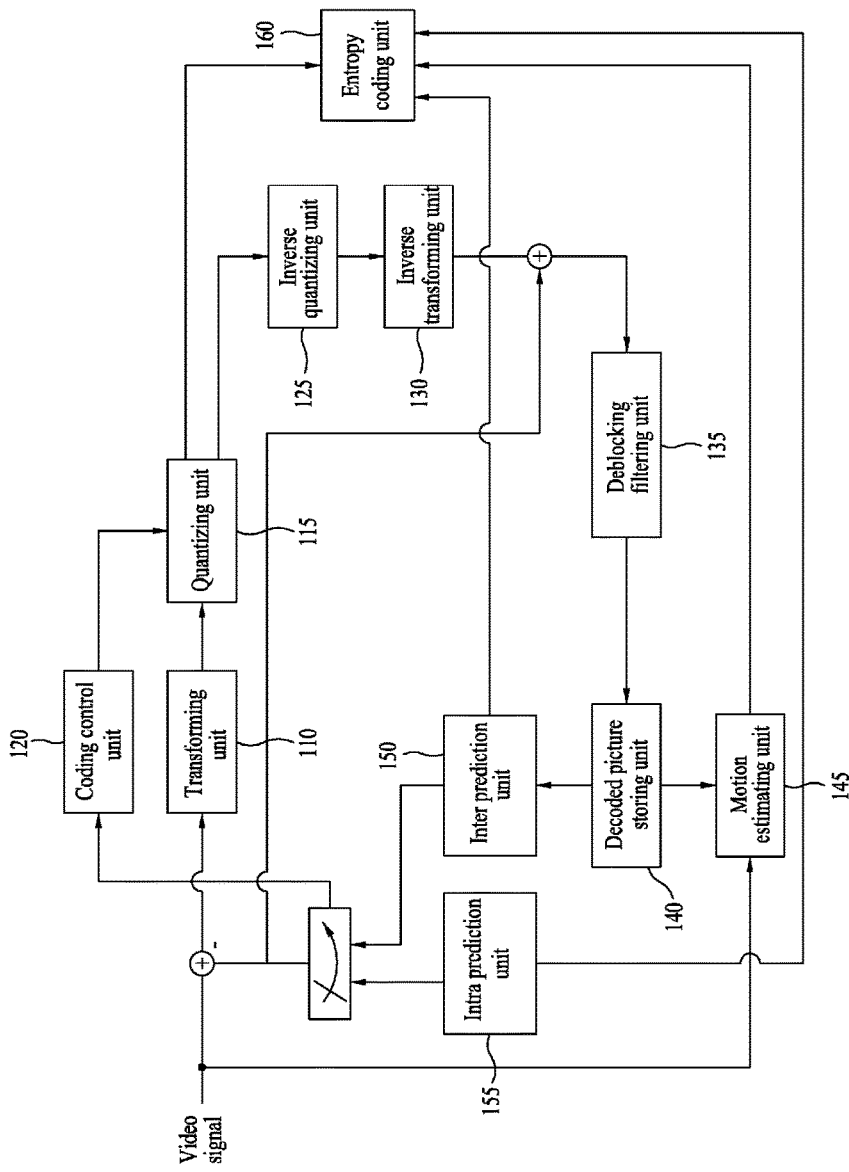
FIG. 1 shows H.264/AVC encoder.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of decoding a video signal includes the steps of obtaining a macroblock type, checking whether a macroblock includes a intra prediction coded sub-macroblock and a inter prediction coded sub-macroblock when a macroblock includes a plurality of coded sub-macroblocks according the macroblock type, when the macroblock includes the intra prediction coded sub-macroblock and the inter prediction coded sub-macroblock, obtaining prediction mode flag information indicating whether the sub-macroblock is the intra prediction coded or the inter prediction coded, when the sub-macroblock is the intra prediction coded based on the prediction mode flag information, obtaining prediction direction information from a block adjacent to the sub-macroblock and a prediction value of the sub-macroblock based on the prediction direction information, and when the sub-macroblock is inter prediction coded based on the prediction mode flag information, obtaining motion information from the block adjacent to the sub-macroblock and a prediction value of the sub-macroblock based on the motion information.

Preferably, the method further includes the step of obtaining mixed prediction mode flag information (NOT_MIX_CODE), wherein the mixed prediction mode flag information indicates whether the macroblock includes the intra prediction coded sub-macroblock and the inter prediction coded sub-macroblock.

Preferably, the method further includes the step of obtaining DC transform size flag information indicating a size of a DC (discrete cosine) transform, determining the DC transform size of the coded sub-macroblock based on the DC transform size flag information, and determining a prediction size of the intra prediction coded sub-macroblock based on the determined DC transform size.

Preferably, the method further includes the step of performing an inverse transform with reference to the determined DC transform size.

Preferably, the method further includes the step of obtaining coded block pattern information, wherein the coded block pattern information indicates whether the sub-macroblocks include coded coefficients.

To further achieve these and other advantages and in accordance with the purpose of the present invention, an apparatus for decoding a video signal includes a mixed prediction mode determining unit obtaining a macroblock type and checking whether a macroblock includes a intra prediction coded sub-macroblock and a inter prediction coded sub-macroblock when a macroblock includes a plurality of coded sub-macroblocks according the macroblock type, a prediction mode flag information obtaining unit, when the macroblock includes the intra prediction coded sub-macroblock and the inter prediction coded sub-macroblock, obtaining prediction mode flag information indicating whether the sub-macroblock is the intra prediction coded or the inter prediction coded, a first sub-macroblock prediction value obtaining unit, when the sub-macroblock is the intra prediction coded based on the prediction mode flag information, obtaining prediction direction information from a block adjacent to the sub-macroblock and a prediction value of the sub-macroblock based on the prediction direction information, and a second sub-macroblock prediction value obtaining unit, when the sub-macroblock is inter prediction coded based on the prediction mode flag information, obtaining motion information from the block adjacent to the sub-macroblock and a prediction value of the sub-macroblock based on the motion information.

Preferably, the mixed prediction mode determining unit obtains mixed prediction mode flag information (NOT_MIX_CODE) and wherein the mixed prediction mode flag information indicates whether the macroblock includes the intra prediction coded sub-macroblock and the inter prediction coded sub-macroblock.

Preferably, the apparatus further includes the step of a DC transform size determining unit obtaining DC transform size flag information indicating a size of a DC (discrete cosine) transform and determining the DC transform size of the coded sub-macroblock based on the DC transform size flag information, wherein the first sub-macroblock prediction value obtaining unit determines a prediction size of the intra prediction coded sub-macroblock based on the determined DC transform size.

Preferably, the apparatus further includes the step of an inverse transform unit performing an inverse transform with reference to the determined DC transform size.

It is to be understood that both the foregoing general description and the following detailed description are exemplary and explanatory and are intended to provide further explanation of the invention as claimed.

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

The following terminologies in the present invention can be construed based on the following criteria and other terminologies failing to be explained can be construed according to the following purposes. First of all, it is understood that the concept 'coding' in the present invention can be construed as either encoding or decoding in case. Secondly, 'information' in this disclosure is the terminology that generally includes values, parameters, coefficients, elements and the like and its meaning can be construed as different occasionally, by which the present invention is non-limited.

FIG. 1 shows H.264/AVC encoder.

Referring to FIG. 1, an H.264/AVC encoder includes a transform unit 110, a quantizing unit 115, a coding control unit 120, a dequantizing unit 125, an inverse transform unit 130, a deblocking filtering unit 135, a decoded picture storing unit 140, a motion estimating unit 145, an inter prediction unit 150, an intra prediction unit 155 and an entropy coding unit 160.

The transform unit 110 obtains a transform coefficient value by transforming a pixel value. In this case, DCT (discrete cosine transform) or wavelet transform can be used. The quantizing unit 115 quantizes the transform coefficient value outputted from the transform unit 110. The coding control unit 120 controls whether to perform intra prediction coding or inter prediction coding on a specific block or frame. The dequantizing unit 125 dequantizes the transform coefficient value. And, the inverse transform unit 130 reconstructs the dequantized transform coefficient value into an original pixel value. The deblocking filtering unit 135 is applied to each coded macroblock to reduce block distortion. A deblocking-filtered picture is stored in the decoded picture storing unit 140 to be used as a reference picture. The motion estimating unit 145 searches reference pictures for a reference block most similar to a current block using the reference picture stored in the decoded picture storing unit 140 and then delivers position information of the searched reference block or the like to the entropy coding unit 160. The inter prediction unit 150 performs prediction of a current picture using the reference picture and then delivers inter prediction coding information to the entropy coding unit 160. The intra prediction unit 155 performs intra prediction from a decoded pixel within the current picture and then delivers intra prediction coding information to the entropy coding unit 160. The entropy coding unit 160 generates a video signal bitstream from performing entropy coding on the quantized transform coefficient, the inter prediction coding information, intra prediction coding information and the reference block information inputted from the motion estimating unit 145 and the like.

Figure 2:
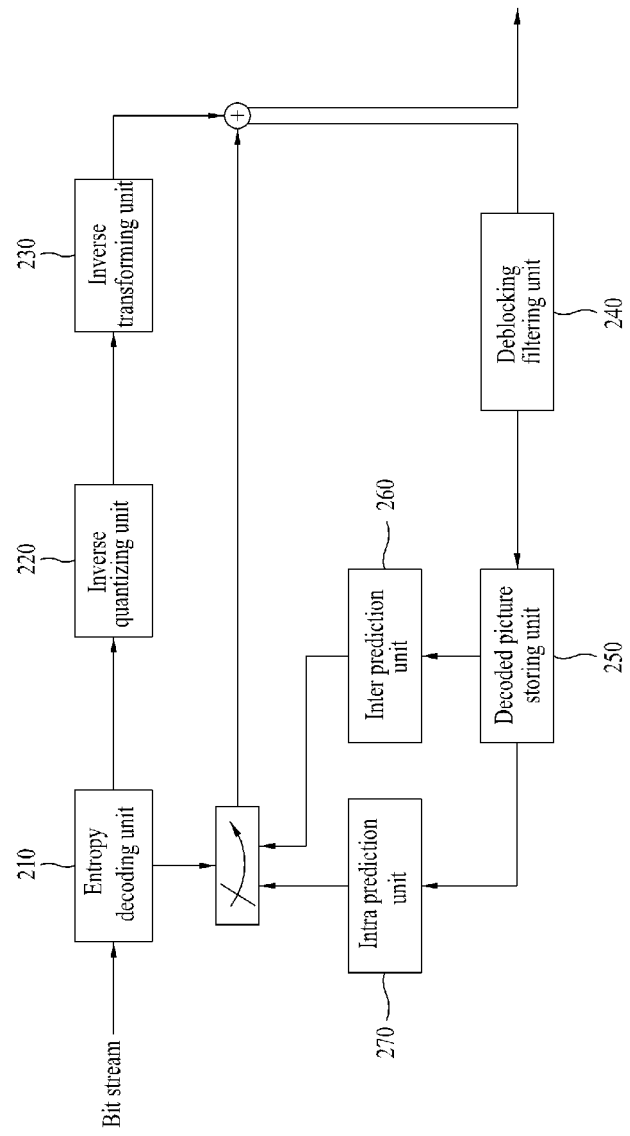
FIG. 2 shows H.264/AVC decoder.

FIG. 2 shows H.264/AVC decoder.

Referring to FIG. 2, a H.264/AVC decoder includes an entropy decoding unit 210, a dequantizing unit 220, an inverse transform unit 230, a deblocking filtering unit 240, a decoded picture storing unit 250, an inter prediction unit 260 and an intra prediction unit 270.

The entropy decoding unit 210 extracts a transform coefficient of each macroblock, a motion vector and the like by performing entropy decoding on a video signal bitstream. The dequantizing unit 220 dequantizes the entropy-decoded transform coefficient. And, the inverse transform unit 230 reconstructs an original pixel value using the dequantized transform coefficient. The deblocking filtering unit 240 is applied to each coded macroblock to reduce block distortion. A filtered picture is outputted or stored in the decoded picture storing unit 250 to be used as a reference picture. The inter prediction unit 260 predicts a current picture using the reference picture stored in the decoded picture storing unit 250 and inter prediction information (reference picture index information, motion vector information, etc.) delivered from the entropy decoding unit 210. And, the intra prediction unit 270 performs intra prediction from a decoded pixel within the current picture. A predicted current picture outputted from the inter or intra prediction unit and a residual from the inverse transform unit 230 are added together to reconstruct an original picture.

Figure 3:
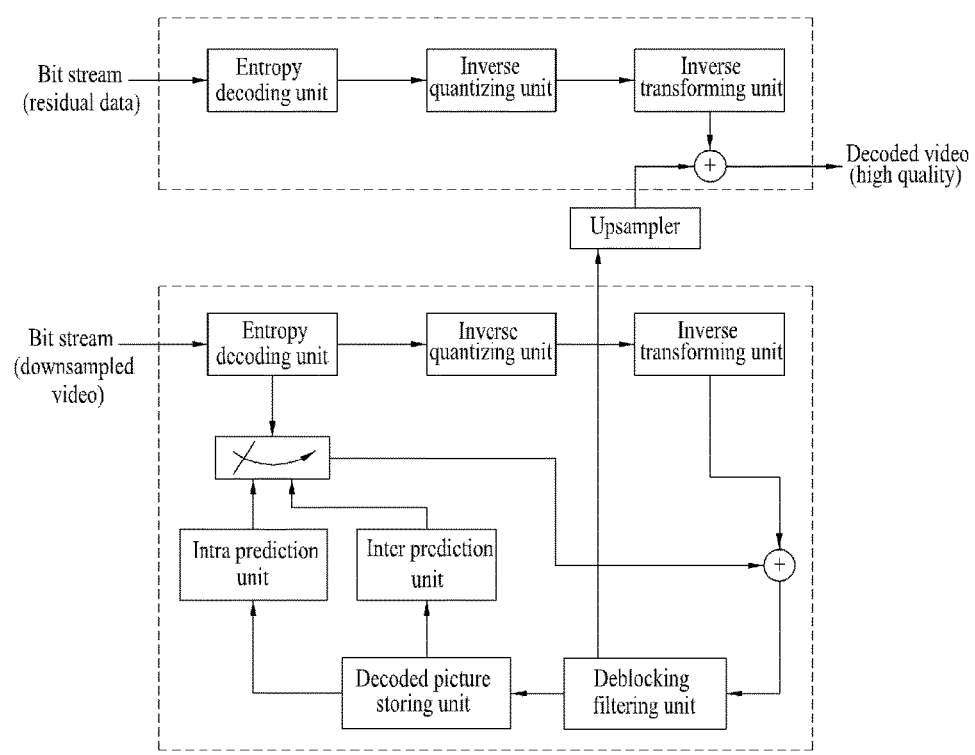
FIG. 3 shows H.264/AVC decoder including a down-sampled frame decoding unit and a residual data decoding unit according to an embodiment of the present invention.

FIG. 3 shows H.264/AVC decoder including a downsampled frame decoding unit and a residual data decoding unit according to an embodiment of the present invention. In general video codec, a frame size is stationary while coding is performed. A partial frame of a video is downsampled or upsampled according to a characteristic of the video to raise coding efficiency. For instance, in case that a video mostly includes a flat region, it is able to raise coding efficiency by coding the video with a downsampled frame. Downsampling of frame can be performed in horizontal direction, vertical direction or both horizontal and vertical directions. In a video, whether to perform downsampling and how to perform the downsampling (if the downsampling is to be performed) can be selected by calculating RD-cost for each method.

Yet, as partial information is removed in the downsampling process, this results in a loss of quality. Hence, it is unable to provide a sufficient gain at a high rate. This problem can be solved by coding a residual between an original frame and an upsampled frame. Meanwhile, whether to perform coding on the residual can be determined by calculating RD-cost as well.

FIG. 4 schematically shows a decoder including a downsampled frame decoding unit (a) and a residual data decoding unit (b) according to an embodiment of the present invention.

Referring to FIG. 4a, an encoder including a residual encoding unit includes an encoding unit 410 including a downsampling unit, an upsampling unit 420, a residual encoding unit 430 and a multiplexing unit 440. The encoding unit 410 including the downsampling unit encodes an original frame by downsampling. The residual encoding unit 430 encodes a residual between the original frame and a frame upsampled by the upsampling unit 420. And, the multiplexing unit 440 generates an output bitstream by mixing the bitstreams encoded by the encoding units 410 and 430.

Referring to FIG. 4b, a decoder including a residual decoding unit includes a demultiplexing unit 450, a decoding unit 460, an upsampling unit 470 and a residual decoding unit 480. The demultiplexing unit 450 parses an inputted bitstream into two bitstreams. An encoded bitstream of a downsampled frame (encoded bitstream 1) is inputted to the decoding unit 460, while an encoded residual bitstream (encoded bitstream 2) is inputted to the residual decoding unit 480. The decoding unit 460 generates a decoded frame by decoding the encoded bitstream of the downsampled frame and then delivers the generated frame to the upsampling unit 470. The upsampling unit 470 upsamples the decoded frame. The residual decoding unit 480 generates a decoded residual by decoding the encoded residual bitstream. Subsequently, a decoded output is generated using the upsampled decoded frame and the decoded residual.

Figure 5:
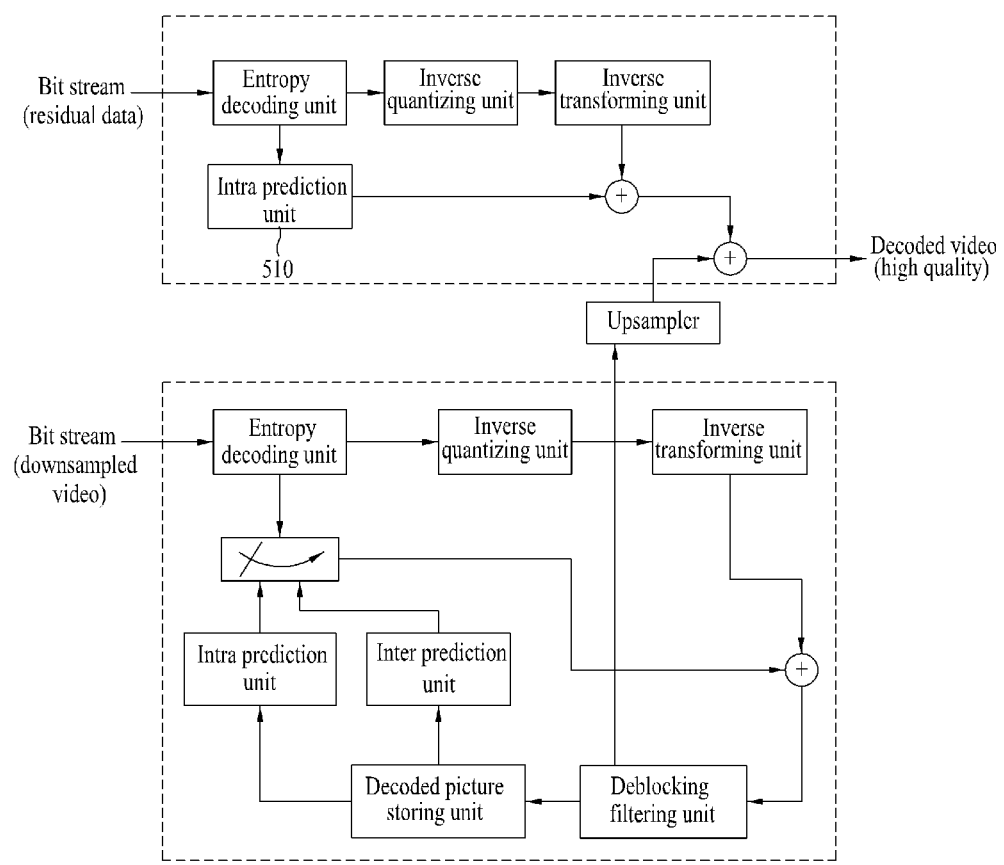
FIG. 5 shows a decoder including an intra prediction unit for performing intra prediction on residual data according to an embodiment of the present invention.

FIG. 5 shows a decoder including an intra prediction unit for performing intra prediction on residual data according to an embodiment of the present invention.

Referring to FIG. 5, intra prediction is performed on residual data encoded through an intra prediction unit 510, whereby encoding and decoding efficiency can be raised.

Figure 6:
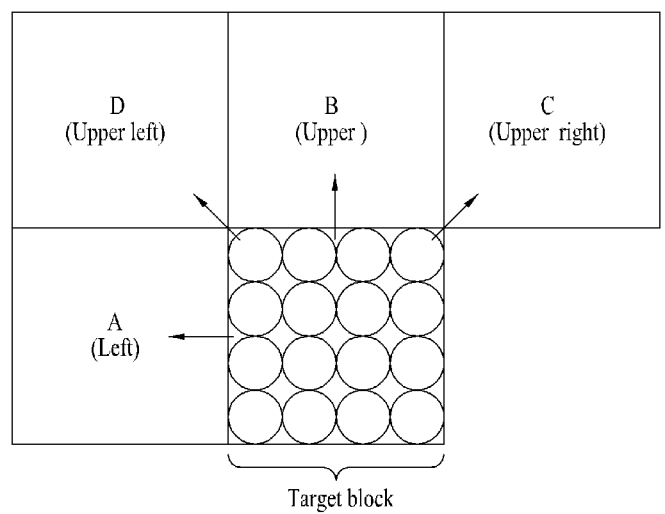
FIG. 6 shows a sequence of 4×4 pixel unit intra prediction coding and a position of a reference block in H.264/AVC coding.

FIG. 6 shows a sequence of 4×4 pixel unit intra prediction coding and a position of a reference block in H.264/AVC coding.

Referring to FIG. 6, encoding is performed in order of blocks 0 to 15 that construct 16×16 macroblock in encoding of H.264/AVC. There are four kinds of predictable reference blocks at a left side A, a top side B, a right top side C and a left top side D. It is able to adaptively select a prediction direction suitable for each block.

FIG. 7 shows intra prediction modes used for 4×4 block in H.264/AVC.

Referring to FIG. 7a, encoding is performed in order of blocks 0 to 15 that construct 16×16 block in 4×4 block intra prediction encoding. In case of a 12th block in FIG. 7a, predictive encoding is performed on a pixel value within 4×4 block using 4 right pixels A in a left block, 4 pixels B at a bottom in a top side block, 4 pixels C at a bottom side in a right top side block and 1 pixel D at a left bottom in a left top side block, as shown in FIG. 7b.

Figure 8:
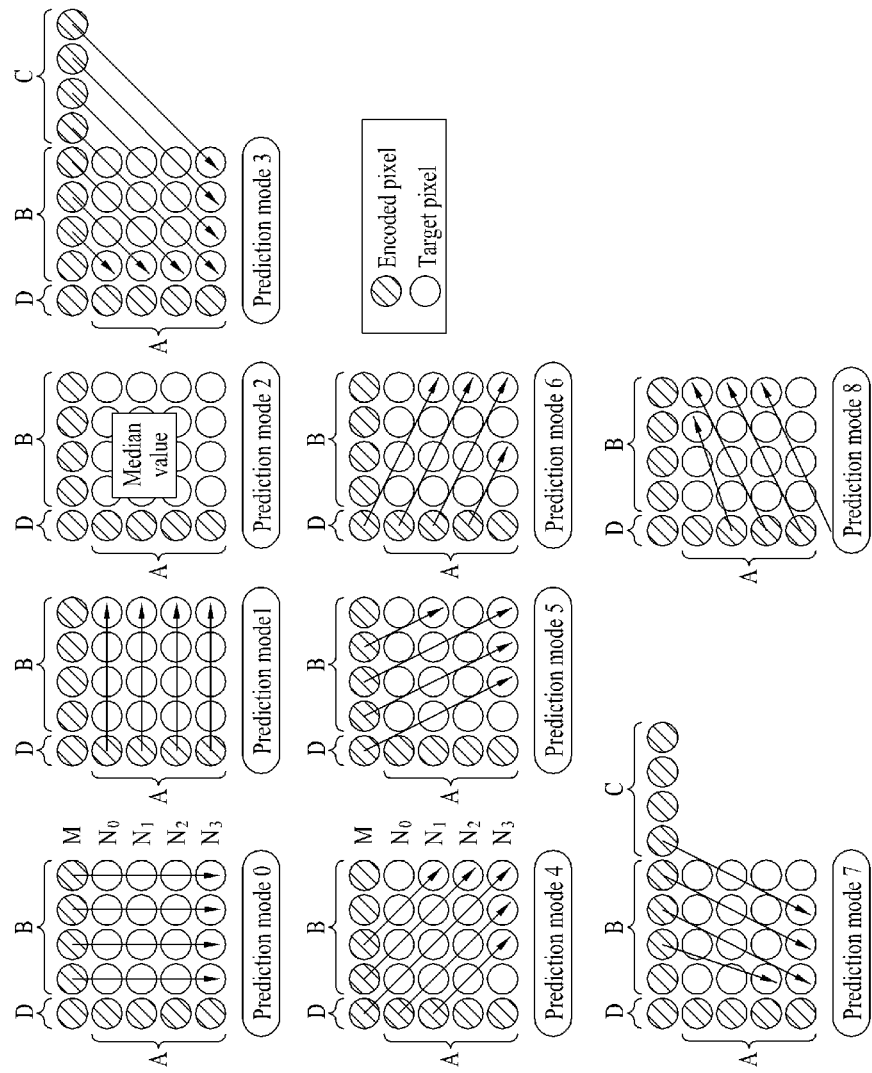
FIG. 8 shows intra prediction modes used for 4×4 block in H.264/AVC.

FIG. 8 shows intra prediction modes used for 4×4 block in H.264/AVC. Intra prediction modes for 8×8 block are basically equal to those used for 4×4 block [not shown in the drawing]. Referring to FIG. 8, one most suitable prediction mode is selected from 9 kinds of prediction modes per 4×4 block. And, the selected prediction mode is then encoded by 4×4 block unit.

In intra prediction coding for 16×16 block in H.264/AVC, prediction coding is performed by selecting one of four methods including vertical prediction (mode 0), horizontal prediction (mode 1), average prediction (mode 3) and planar prediction (mode 3) from 16 pixels of a top side macroblock and 16 pixels of a left side macroblock [not shown in the drawing].

Yet, a high-resolution video of 4K (3840×2160) or 8B (7680×4320) much greater than a currently and widely used video of 2K level (1920×1080) has characteristics different from those of the 2K-level video due to high resolution. For instance, the current H.264/AVC uses a fixed 16×16 macroblock only but fails to support macroblocks in various sizes. And, a texture of high-resolution video may not be sufficiently reflected. If a macroblock having a size of 32×32 greater than a current size of 16×16 or a greater size is used, a compression ratio can be enhanced.

Figure 9:
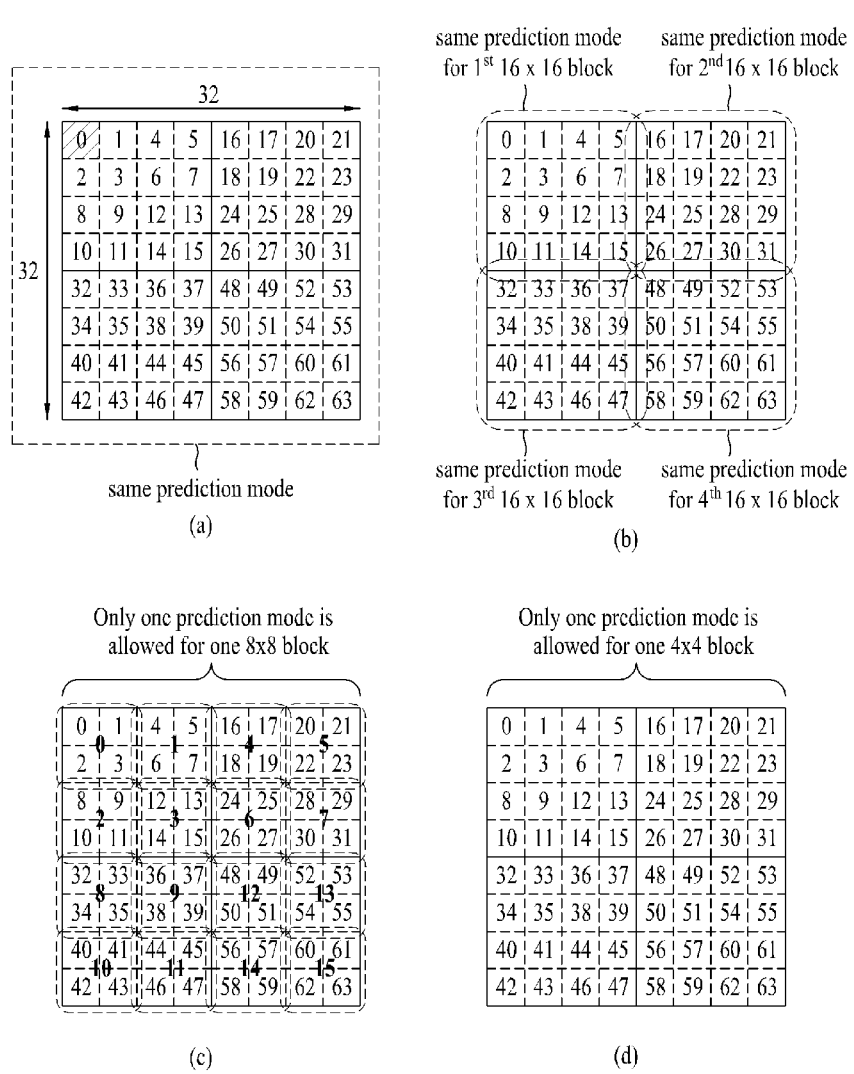
FIG. 9 shows an intra prediction method used for 4×4 block if a macroblock according to an embodiment of the present invention is 32×32 block.

FIG. 9 shows an intra prediction method used for 4×4 block if a macroblock according to an embodiment of the present invention is 32×32 block. Specifically, a numeral represented in a block shown in FIG. 9 indicates encoding and decoding sequences of the corresponding block. Referring to FIG. 9a, if a size of a macroblock is 32×32, it is able to use one prediction mode for each 4×4 block. In particular, one most suitable prediction mode is selected from the 9 kinds of prediction modes shown in FIG. 8 for each 4×4 block and the selected prediction mode can be coded by 4×4 block unit. For instance, if an encoder selects a vertical prediction mode for a 0th block, encodes the selected prediction mode and then transmits the encoded prediction mode in FIG. 9a, a decoder decodes the 0th block using the received vertical prediction mode. Subsequently, a reconstructed residual is added to a prediction sample. A 1st block is then decoded using a vertical prediction mode equal to a prediction mode of the 0th block and the reconstructed 0th block. In this manner, decoding is performed on the entire 32×32 block.

Referring to FIG. 9b, if a size of a macroblock is 32×32, it is able to use one prediction mode for each 16×16 block. In particular, one most suitable prediction mode is selected from the 9 kinds of prediction modes shown in FIG. 8 for each 16×16 block and the selected prediction mode can be coded by 4×4 block unit. For instance, if an encoder selects a vertical prediction mode for a 1st 16×16 block, the encoder encodes the selected prediction mode and then transmits the encoded prediction mode in FIG. 9b, a decoder decodes the 0th block using the received vertical prediction mode. Subsequently, a reconstructed residual is added to a prediction sample. A 1st block is then decoded using a vertical prediction mode equal to a prediction mode of the 0th block and the reconstructed 0th block. In this manner, all blocks in the 1st 16×16 block are decoded. Subsequently, other 16×16 blocks are decoded in order of second, third and fourth.

Referring to FIG. 9c, if a size of a macroblock is 32×32, it is able to use one prediction mode for each 8×8 block. In particular, one most suitable prediction mode is selected from the 9 kinds of prediction modes shown in FIG. 8 for each 8×8 block and the selected prediction mode can be coded by 4×4 block unit. For instance, if an encoder selects a vertical prediction mode for a 8×8 block represented as 0, the encoder encodes the selected prediction mode and then transmits the encoded prediction mode in FIG. 9c, a decoder decodes the 0th 4×4 block using the received vertical prediction mode. Subsequently, a reconstructed residual is added to a prediction sample. A 1st 4×4 block is then decoded using a vertical prediction mode equal to a prediction mode of the 0th 4×4 block and the reconstructed 0th 4×4 block. In this manner, all blocks in the 8×8 block represented as 0 are decoded. Subsequently, other 8×8 blocks are decoded in displayed order.

Referring to FIG. 9d, if a size of a macroblock is 32×32, it is able to use one prediction mode for each 4×4 block constructing the macroblock. In particular, one most suitable prediction mode is selected from the 9 kinds of prediction modes shown in FIG. 8 for each 4×4 block and the selected prediction mode can be coded by 4×4 block unit. All blocks in the 32×32 block are decoded in order shown in FIG. 9d using each prediction mode.

Meanwhile, the intra prediction method used for the 4×4 block shown in one of FIGS. 9a to 9d can be adaptively used by indicating which one of the four kinds of methods is used for a current macroblock. For instance, a different method is used for each macroblock by displaying a specific method on a macroblock (MB) layer. Alternatively, it is able use a different method for each slice by displaying a specific method on a slice layer.

Figure 10:
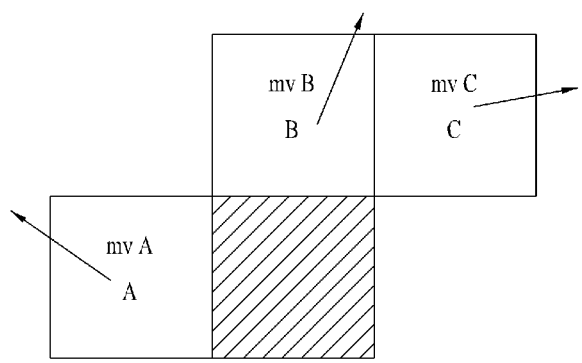
FIG. 10 shows a method of predicting a motion vector of a current block in inter prediction of H.264/AVC.

FIG. 10 shows a method of predicting a motion vector of a current block in inter prediction of H.264/AVC. Referring to FIG. 10, H.264/AVC uses prediction coding of a median value. Prediction coding of a motion vector uses median values of horizontal and vertical components using motion vectors mvA, mvB and mvC of left, top and right top blocks A, B and C.

The H.264/AVC estimates a motion from a frame which was encoded by dividing a video frame and then uses a motion compensation for predicting a current block. If a block size for the motion compensation is reduced, a precise prediction is possible. Yet, since motion vector information needs to be coded, a coding size for the motion vector information increases. This is why a method of applying an optimal block size among various motion compensation block sizes is used.

FIG. 11 shows a motion compensation block size in H.264/AVC.

Referring to FIG. 11, in H.264/AVC uses 7 motion compensation block sizes ranging from 16×16 block to 4×4 block. One macroblock type (MB type) among 16×16 block, 16×8 block, 8×16 block and 8×8 block is coded for each macroblock [FIG. 11a]. In case that a macroblock type is 8×8 block, one sub-macroblock type (Sub_MB type) among 8×8 block, 8×4 block, 4×8 block and 4×4 block is coded for each sub-macroblock [FIG. 11b]. In H.264/AVC, an inter prediction mode is used as a sub-macroblock type only. Even if a size of macroblock is 32×32 greater than 16×16, it is able to use an inter prediction mode can be used as a sub-macroblock type only.

Figure 12:
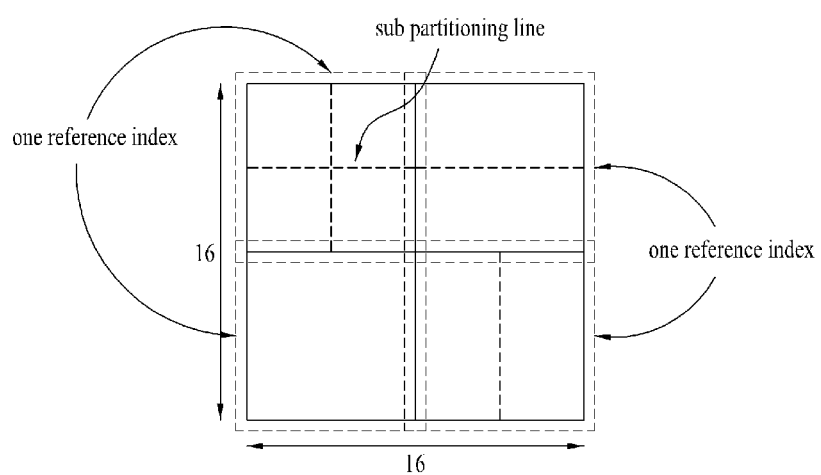
FIG. 12 shows a reference picture index assigning method in H.264/AVC.

FIG. 12 shows a reference picture index assigning method in H.264/AVC.

Referring to FIG. 12, a reference picture index (ref_idx) indicating reference picture information required for motion compensation is coded per each motion compensation block if a macroblock is not 8×8 block. If a macroblock having a block size equal to or smaller than 8×8 is 8×8, a reference picture index is coded by a macroblock unit to prevent an information size from increasing according to motion compensation. As a result, in a block smaller than 8×8 block, e.g., 4×4 block, even if a motion vector differs, a reference picture index does not differ within a sub-macroblock.

Figure 13:
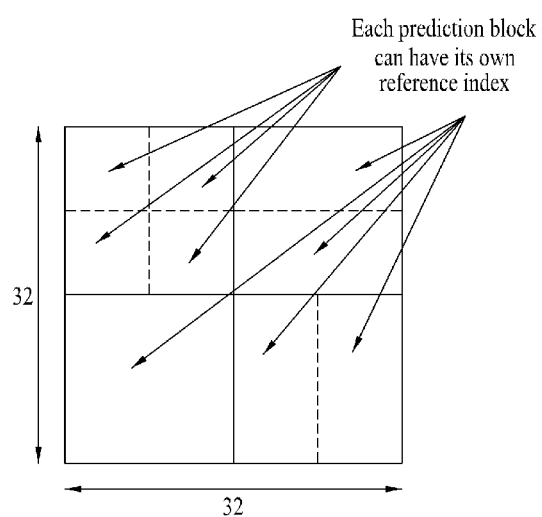
FIG. 13 shows a reference picture index assigning method in 32×32 macroblock according to an embodiment of the present invention.

FIG. 13 shows a reference picture index assigning method in 32×32 macroblock according to an embodiment of the present invention. If a reference picture allocating method applied to the H.264/AVC shown in FIG. 12 is identically applied to a case that a macroblock size is 32×32, since one reference picture index s assigned to 16×16 block, a reference picture index is unable to differ in every block smaller than the 16×16 block.

Yet, referring to FIG. 13, it is able to raise coding efficiency by allowing a different reference picture index for a block smaller than 16×16 block.

FIG. 14 shows a syntax structure indicating a reference picture index assigning method in 32×32 macroblock according to an embodiment of the present invention. FIG. 14a shows a syntax structure according to a related art. FIG. 14b shows a syntax structure for assigning a reference picture index to each sub-macroblock partition resulting from partitioning 16×16 sub-macroblock instead of assigning one reference picture index to the 16×16 sub-macroblock.

FIG. 15 shows sub-macroblock types of a P macroblock (a) and a B macroblock (b) in 32×32 macroblock size according to an embodiment of the present invention. Referring to FIG. 15, an inter prediction mode is used as a sub-macroblock type. If a macroblock size increases for each 16×16 block, e.g., in case of 32×32 block, a space for using more macroblock types can be provided. And, prediction efficiency may be higher if intra prediction is used despite P or B macroblock. Hence, it is able to use an intra prediction type as a sub-macroblock type.

For instance, an intra prediction type of I16×16, I8×8 or I4×4 is available for a sub-macroblock type. If an intra prediction type is selected as a sub-macroblock type, since a macroblock has a 32×32 block size, one prediction mode should be transmitted for I16×16, 4 prediction modes should be transmitted for I8×8, or 16 prediction modes should be transmitted for I4×4. Meanwhile, by means of using the same intra prediction mode for one intra prediction coded sub-macroblock, it is able to reduce a size of prediction mode information to be transmitted.

Figure 16:
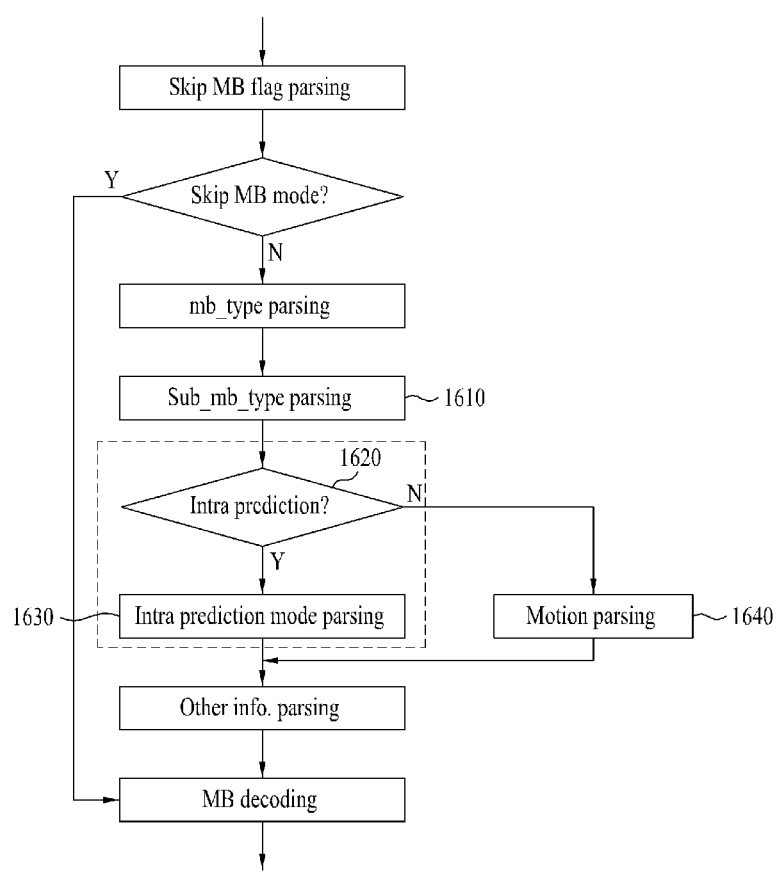
FIG. 16 shows a macroblock decoding process in case that an intra prediction type is added to a sub-macroblock according to an embodiment of the present invention.

FIG. 16 shows a macroblock decoding process in case that an intra prediction type is added to a sub-macroblock according to an embodiment the present invention.

Referring to FIG. 16, after a sub-macroblock type has been received [1610], it is checked whether the sub-macroblock type is an intra prediction type [1620]. If the sub-macroblock type is the intra prediction type [1630], a macroblock is decoded using the received intra prediction mode. If the sub-macroblock type is not the intra prediction type [140], a macroblock is decoded using received motion information.

Figure 17:
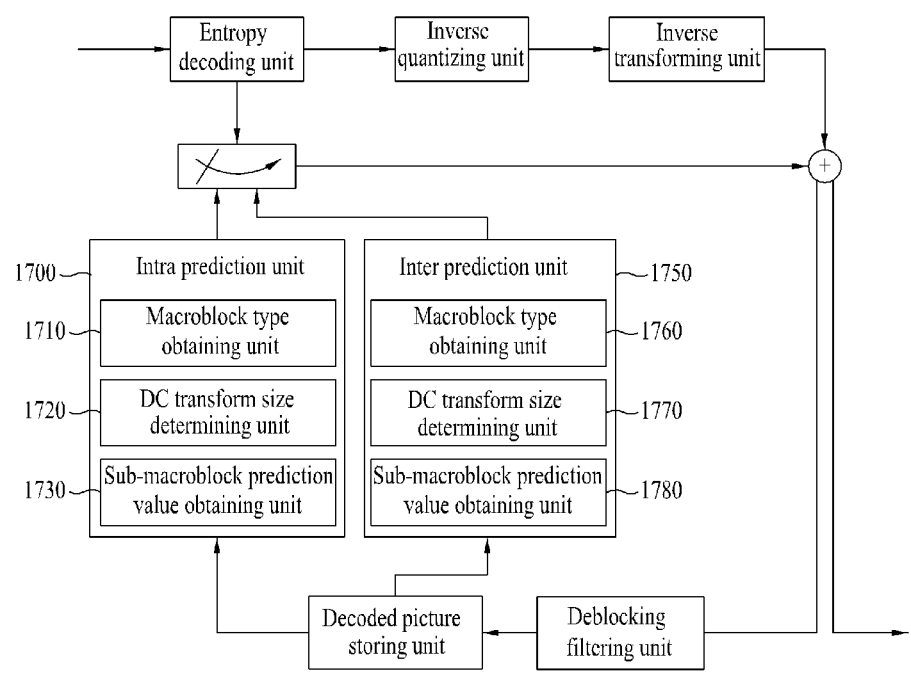
FIG. 17 shows a decoder including an intra prediction unit and an inter prediction unit according to an embodiment of the present invention.

FIG. 17 shows a decoder including an intra prediction unit and an inter prediction unit according to an embodiment of the present invention.

Referring to FIG. 17, a decoder according to an embodiment of the present invention includes an intra prediction unit 1700 and an inter prediction unit 1750. The intra prediction unit 1700 includes a macroblock type obtaining unit 1710, a DC transform size determining unit 1720 and a sub-macroblock prediction value obtaining unit 1730. The inter prediction unit 1750 includes a macroblock type obtaining unit 1760, a DC transform size determining unit 1770 and a sub-macroblock prediction value obtaining unit 1780. The macroblock type obtaining unit 1710/1760 obtains a macroblock type. If the macroblock includes a plurality of coded sub-macroblocks according to the macroblock type, the macroblock type obtaining unit 1710/1760 obtains a sub-macroblock type. The DC transform size determining unit 1720/1770 obtains flag information indicating a DC (discrete cosine) transform size and then determines a DC transform size of a coded sub-macroblock based on the flag information. If the sub-macroblock is coded using intra prediction based on the sub-macroblock type, the sub-macroblock prediction value obtaining unit 1730 determines a prediction size of the sub-macroblock coded using the intra prediction based on the determined DC transform size, obtains prediction direction information from a block adjacent to the sub-macroblock based on the prediction size of the sub-macroblock, and then obtains a prediction value of the sub-macroblock based on the prediction direction information. If the sub-macroblock is coded using inter prediction based on the sub-macroblock type, the sub-macroblock prediction value obtaining unit 1780 obtains motion information from a block adjacent to the sub-macroblock and then obtains a prediction value of the sub-macroblock based on the motion information.

Figure 18:
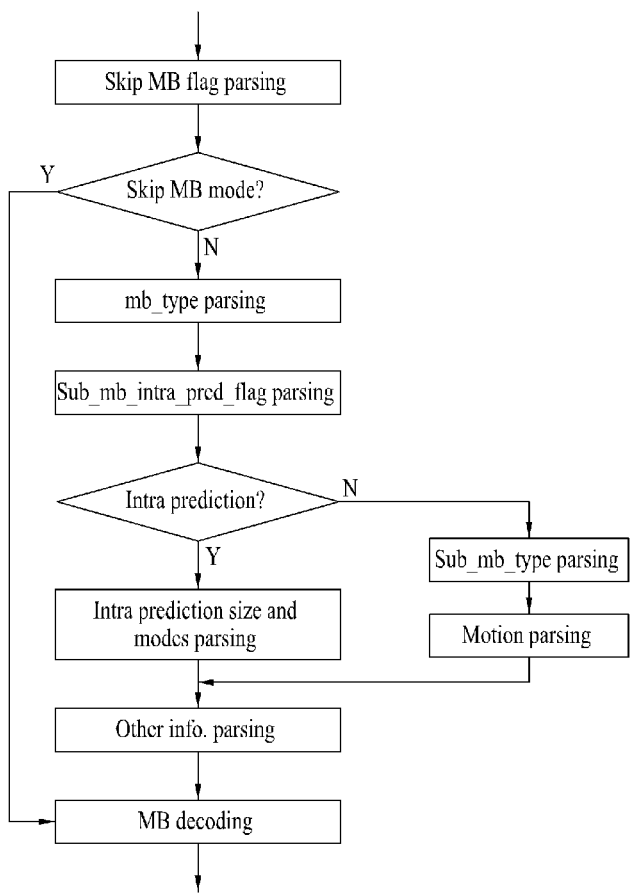
FIG. 18 shows a macroblock decoding process including a step of receiving a flag indicating whether to perform intra prediction on a sub-macroblock according to an embodiment of the present invention.

FIG. 18 shows a macroblock decoding process including a step of receiving a flag indicating whether to perform intra prediction on a sub-macroblock according to an embodiment of the present invention. If an intra prediction type is added to a sub-macroblock, as the number of sub-macroblock types is incremented, a data size to be transmitted may increase. To solve this problem, by transmitting a flag (sub_mb_intra_pred_flag) confirming whether a sub-macroblock performs intra prediction before transmitting a sub-macroblock type, if the flag is set to 1, a block size and an intra prediction mode are transmitted instead of a sub-macroblock type. On the contrary, if the flag is set to 0, a sub-macroblock type is transmitted. And, a macroblock is decoded using a received type and motion information.

In H.264/AVC, an analog video is parsed into a higher frequency component and a lower frequency component using orthogonal transform of 8×8 or 4×4 pixel unit to facilitate compression. If a size of a macroblock becomes greater than 16×16, it is necessary to raise compression efficiency using a proper transform block size. Although a 4×4 or 8×8 transform block size used for H.264/AVC may be available, it may be necessary to perform a transform having a greater block size to secure higher compression efficiency.

For a macroblock having a size 32×32 greater than a current 16×16 or a size greater than 32×32, orthogonal transform by a pixel unit equal to or greater than 8×8, e.g., a pixel unit of 16×8, 8×16 or 16×16 is available. Moreover, although the conventional H.264/AVC just uses a flag (transform_size_8×8_flag) confirming whether orthogonal transform by 8×8 pixel unit is used only, it is possible to additionally use a flag confirming whether orthogonal transform by 16×16 pixel unit is used for a macroblock having a size of 32×32 or greater as well as the above flag. If these flags are used, it is able to check whether the orthogonal transform by the pixel unit of 16×16, 8×8 or 4×4 is used.

Figure 19:
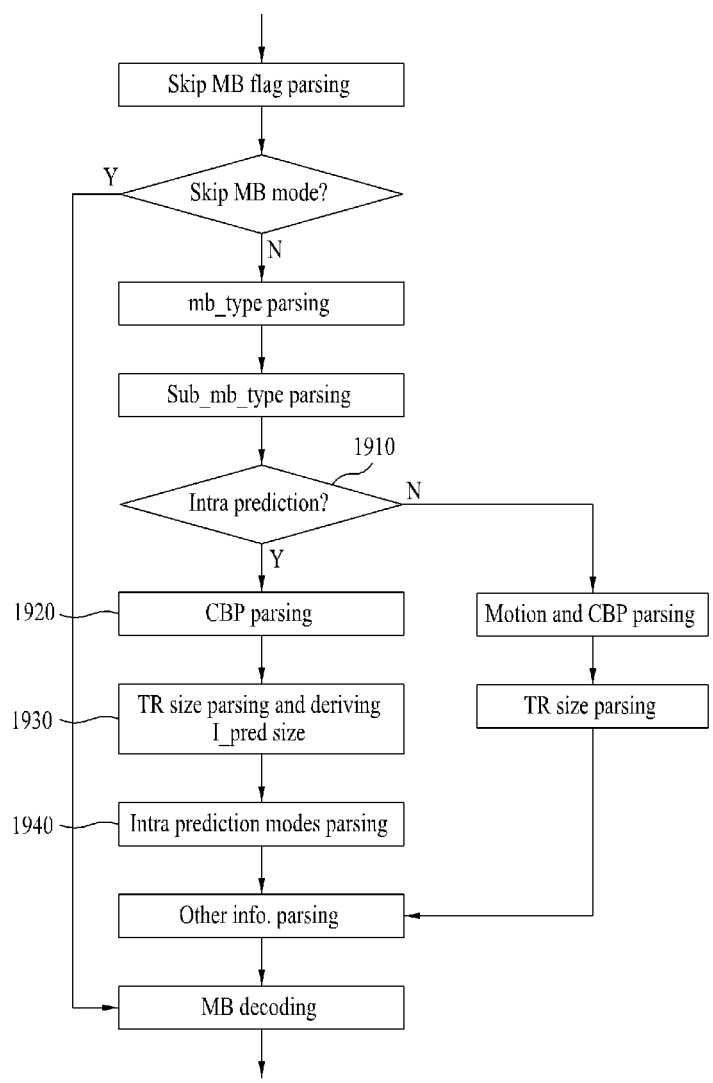
FIG. 19 shows a macroblock decoding process including a step of determining a size of intra prediction to apply through a flag indicating a transform size according to an embodiment of the present invention.

FIG. 19 shows a macroblock decoding process including a step of determining a size of intra prediction to apply through a flag indicating a transform size according to an embodiment of the present invention. It is possible to estimate an intra prediction size via a flag indicating a transform size. If a sub-macroblock type is an intra prediction type 1910 and an orthogonal transform by 4×4 pixel unit is used, intra prediction coding of 4×4 block is applied. If a sub-macroblock type is an intra prediction type and an orthogonal transform by 8×8 pixel unit is used, intra prediction coding of 8×8 block is applied. If a sub-macroblock type is an intra prediction type and an orthogonal transform by 16×16 pixel unit is used, intra prediction coding of 16×16 block is applicable 1930, 1940.

Referring to FIG. 19, a step of obtaining coded block pattern (coded_block_pattern) information is included in a macroblock decoding process 1920. The decoded block pattern information is used to indicate whether blocks within one macroblock contain coded coefficients (coded_coefficient).

FIG. 20 shows a method of displaying a coded block pattern in H.264/AVC. Referring to FIG. 20, in H.264/AVC, it is able to use 6 bits (4 bits for a luminance signal, 2 bits for a chroma signal) for one macroblock. In case that macroblock size is 16×16, 1 bit is used for each 8×8 block in a luminance signal. If there is a coded efficient, '1' is coded. If there is no coded coefficient, '0' is coded. Meanwhile, in the chroma signal (Cr, Cb), if there is a DC (direct current) signal in the chroma signals Cr and Cb, '1' is coded. If there is no DC signal, '0' is coded. Likewise, if there is an AC (alternating current) signal in the chroma signals Cr and Cb, '1' is coded. If there is no AC signal, '0' is coded.

Yet, in a macroblock having a size 32×32 greater than a current 16×16 or a size over 32×32, a method of representing a coded block pattern needs to be modified in consideration of coding efficiency and complexity.

FIG. 21 shows a method of displaying a coded block pattern hierarchically in 32×32 block according to an embodiment of the present invention.

Referring to FIG. 21a, by applying the above method described with reference to FIG. 20, 1 bit is used for each 16×16 block in a luminance signal, 1 bit is used for a DC signal, and 1 bit is used for an AC signal. Moreover, if a bit of a coded block pattern of 16×16 block is '0' in a luminance signal, there is no additional information in 16×16 block. Yet, if a bit of a coded block pattern is '1', it is possible to additionally use 4 bits for 16×16 block. In particular, it is able to use 1 bit each to indicate whether each 8×8 bock in 16×16 block contains a coded coefficient [FIG. 21b]. In a chroma signal, referring to FIG. 21c, as a DC signal exists in a chroma signal Cr and Cb, if a bit of a coded block pattern is set to 1, it is able to additionally use 1 bit to indicate whether each of the chroma signal components Cr and Cb contains a coded coefficient. Likewise, as an AC signal exists in a chroma signal Cr and Cb, if a bit of a coded block pattern is set to 1, it is able to additionally use 1 bit to indicate whether each of the chroma signal components Cr and Cb contains a coded coefficient.

FIG. 22 shows a method of displaying a coded block pattern in 32×32 macroblock according to another embodiment of the present invention. Referring to FIG. 22a, 1 bit is used for each 16×16 block in a luminance signal and it is able to use 1 bit is used for each of the chroma signal components Cr and Cb. Moreover, as mentioned in the foregoing description with reference to FIG. 20, if a bit of a coded block pattern of 16×16 block is '0' in a luminance signal, there is no additional information in 16×16 block. Yet, if a bit of a coded block pattern is '1', it is possible to additionally use 4 bits for 16×16 block. In particular, referring to FIG. 22b, it is able to use 1 bit each to indicate whether each 8×8 bock in 16×16 block contains a coded coefficient. In a chroma signal, like the luminance signal, if a bit of a coded block pattern of each of the chroma signal components Cr and Cb of 16×1 block is set to 0, although there is no additional information in 16×16 block. If a bit of the coded block pattern is set to 1, it is able to additionally use 4 bits in 16×16 block [FIG. 22b].

Figure 23:
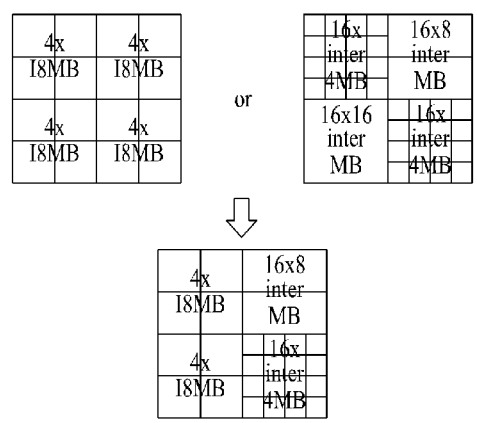
FIG. 23 shows inter/intra mixed mode prediction using both inter prediction coding and intra prediction coding for one macroblock according to an embodiment of the present invention.

FIG. 23 shows inter/intra mixed mode prediction using both inter prediction coding and intra prediction coding for one macroblock according to an embodiment of the present invention.

In current H.264/AVC, it is able to use either inter prediction coding or intra prediction coding for one macroblock only. Yet, if a size of a macroblock having a size of 32×32 greater than a current 16×16 or a size over 32×32, it is able to achieve high compression performance using both of the inter prediction coding and the intra prediction coding for one macroblock. By enabling sub-macroblocks within 32×32 macroblock to have sizes differing from one another, i.e., by adopting a plurality of intra prediction modes of sub-macroblocks within 32×32 macroblock, high compression performance can be achieved. Yet, referring to FIG. 23, it is able to achieve higher compression performance by predicting sub-macroblocks within one macroblock in a manner of mixing the inter prediction and the intra prediction together.

Meanwhile, if a macroblock includes a sub-macroblock coded using intra prediction and a sub-macroblock coded using inter prediction, a prediction mode flag indicating whether each of the sub-macroblocks is inter-predicted or intra-predicted is transmitted for each sub-macroblock. Moreover, it is able to transmit inter prediction information (e.g., reference picture index information, motion vector information, etc.) for the inter prediction coded sub-macroblock and prediction direction information for the intra prediction coded sub-macroblock.

Meanwhile, by transmitting DC transform size flag information indicating a DC transform size, as mentioned in the foregoing description with reference to FIG. 19, it is able to specify a prediction mode of the intra prediction coded sub-macroblock.

Moreover, as mentioned in the foregoing description, before transmitting the flag indicating whether each of the sub-macroblocks is inter-predicted or intra-predicted, a mixed prediction mode flag information (NOT_MIXED_MODE) indicating whether all sub-macroblocks within one macroblock are coded by the same prediction type inter prediction or intra prediction), i.e., whether one macroblock includes a sub-macroblock coded by intra prediction and a sub-macroblock coded by inter prediction is transmitted. Hence, if sub-macroblocks within one macroblock are not coded by the same prediction type, i.e., if a sub-macroblock coded by intra prediction and a sub-macroblock coded by inter prediction are included, as mentioned in the foregoing description, prediction mode flag information (prediction mode flag) indicating whether each sub-macroblock is coded by the inter prediction or the intra prediction is transmitted for each sub-macroblock. Furthermore, a prediction mode is transmitted for the inter prediction coded sub-macroblock and transform size flag information is transmitted for each sub-macroblock. Therefore, it is able to specify a prediction mode of a prediction-coded sub-macroblock within a picture.

Figure 24:
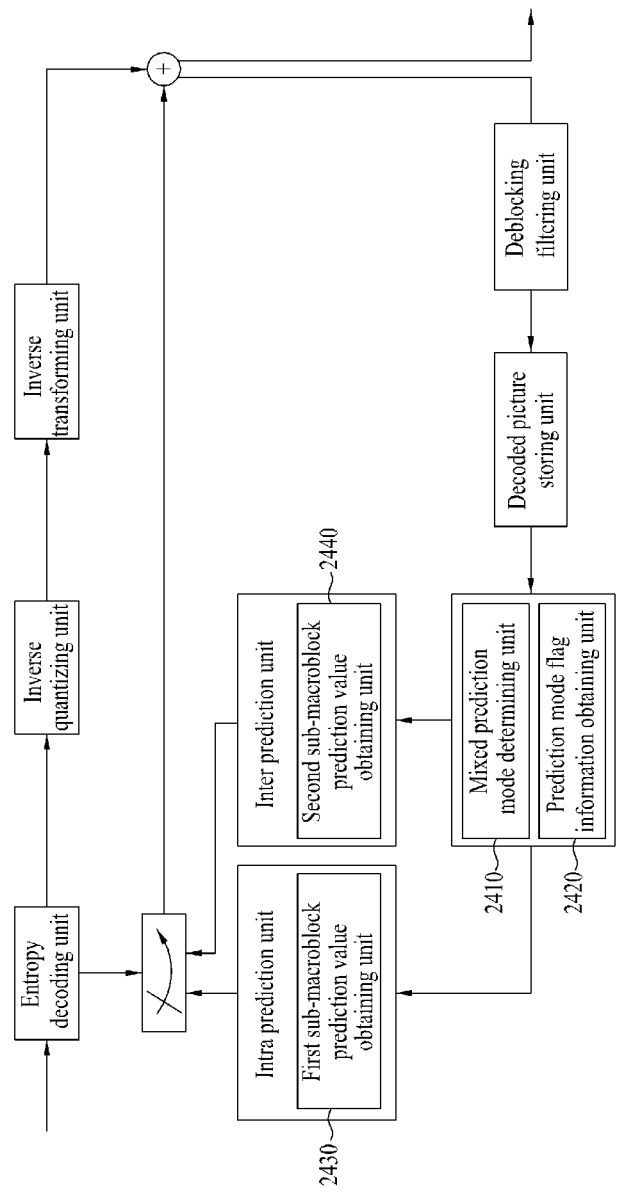
FIG. 24 shows a decoder including a mixed prediction mode determining unit according to an embodiment of the present invention.

FIG. 24 shows a decoder including a mixed prediction mode determining unit according to an embodiment of the present invention. Referring to FIG. 24, the decoder includes a mixed prediction mode determining unit 2410, a prediction mode flag information obtaining unit 2420, a first sub-macroblock prediction value obtaining unit 2430, and a second sub-macroblock prediction value obtaining unit 2440. The mixed prediction mode determining unit 2410 obtains a macroblock type. If this macroblock includes a plurality of coded sub-macroblocks according to the macroblock block, the mixed prediction mode determining unit 2410 checks whether the macroblock includes a sub-macroblock coded by intra prediction and a sub-macroblock coded by inter prediction. If the macroblock includes the sub-macroblock coded by the intra prediction and the sub-macroblock coded by the inter prediction, the prediction mode flag information obtaining unit 2420 obtains prediction mode flag information (prediction mode flag) indicating whether the sub-macroblock is coded by the intra prediction or the inter prediction. If the sub-macroblock is coded by the intra prediction, the first sub-macroblock prediction value obtaining unit 2430 obtains prediction direction information from a block adjacent to the sub-macroblock based on the prediction mode flag information. The first sub-macroblock prediction value obtaining unit 2430 obtains a prediction value of the sub-macroblock based on the prediction direction information. If the sub-macroblock is coded by the inter prediction, the second sub-macroblock prediction value obtaining unit 2440 obtains motion information from a block adjacent to the sub-macroblock based on the prediction mode flag information and then obtains a prediction value of the sub-macroblock based on the motion information.

The mixed prediction mode determining unit 2410 is able to obtain mixed prediction mode flag information (NOT_MIX_CODE) indicating whether the macroblock includes a sub-macroblock coded by intra prediction and a sub-macroblock coded by inter prediction. The intra prediction unit obtains DC transform size flag information indicating a size of a DC (discrete cosine) transform size and includes a DC transform size determining unit determining a DC transform size of the coded sub-macroblock based on the DC transform size information. Therefore, the mixed prediction mode determining unit 2410 is able to determine a predicted size of the coded sub-macroblock using the intra prediction based on the determined DC transform size.

As mentioned in the above description, a video signal decoding method and/or apparatus according to the present invention is provided to a multimedia broadcast transmitting/receiving device to be used in decoding a video signal.

Accordingly, the present invention provides the following effects and/or advantages.

First of all, coding efficiency of a video signal can be raised in a manner of adding an intra prediction mode as a sub-macroblock type in predicting a macroblock having a size of 32×32 greater than 16×16 or a size greater than 32×32.

Secondly, coding efficiency of a video signal can be raised by using both of inter prediction mode and intra prediction mode for one macroblock in predicting a macroblock having a size of 32×32 greater than 16×16 or a size greater than 32×32.

Thirdly, a sufficient gain can be provided in a downsampling process in a manner of coding a residual between an original frame and an upsampled frame.

The invention claimed is:

1. A method for decoding a video signal by a decoding apparatus, the video signal including at least one chrominance block to be partitioned into a plurality of sub-blocks, the method comprising:
   obtaining, by the decoding apparatus from the video signal, first information for the chrominance block, the first information specifying whether the chrominance block contains transform coefficient information;
   obtaining, by the decoding apparatus from the video signal, second information for each of the plurality of sub-blocks based on the first information having a value of 1, the second information of a first sub-block specifying whether the first sub-block contains transform coefficient information;
   obtaining, by the decoding apparatus from the video signal, the transform coefficient information of the first sub-block based on the second information of the first sub-block having the value of 1; and
   performing, by the decoding apparatus, an inverse-transform operation based on the obtained transform coefficient information.

2. The method according to claim 1, wherein the video signal does not contain additional information for the chrominance block based on the first information having a value of 0.

3. The method according to claim 1, wherein the video signal does not contain additional information for the first sub-block based on the second information of the first sub-block having a value of 0.

4. The method according to claim 1, further comprising:
   obtaining, by the decoding apparatus from the video signal, transform coefficient information of a second sub-block based on the second information of the second sub-block having the value of 1; and
   performing, by the decoding apparatus, an inverse-transform operation on the obtained transform coefficient information of the second block.

5. The method according to claim 4, wherein the video signal does not contain additional information for the second sub-block based on the second information of the second sub-block having a value of 0.

6. The method according to claim 1, wherein the chrominance block is partitioned into the plurality of sub-blocks based on a transform block unit for performing the inverse-transform operation.

7. The method according to claim 1, wherein the chrominance block contains a Cb or Cr signal.

8. The method according to claim 1, wherein the chrominance block has a size of 16×16 and each of the plurality of sub-blocks has a size of 8×8.

9. The method according to claim 1, wherein the chrominance block has a size of 8×8 and each of the plurality of sub-blocks has a size of 4×4.

10. An apparatus configured to decode a video signal including at least one chrominance block to be partitioned into a plurality of sub-blocks, the apparatus comprising:
an entropy decoding unit configured to:
obtain, from the video signal, first information for the chrominance block, the first information specifying whether the chrominance block contains transform coefficient information,
obtain, from the video signal, second information for each of the plurality of sub-blocks based on the first information having a value of 1, the second information of a first sub-block specifying whether the first sub-block contains transform coefficient information, and
obtain, from the video signal, the transform coefficient information of the first sub-block based on the second information of the first sub-block having the value of 1; and
an inverse-transform unit configured to perform an inverse-transform operation based on the obtained transform coefficient information.

11. The apparatus according to claim 10, wherein the video signal does not contain additional information for the chrominance block based on the first information having a value of 0.

12. The apparatus according to claim 10, wherein the video signal does not contain additional information for the first sub-block based on the second information of the first sub-block having a value of 0.

13. The apparatus according to claim 10, wherein the entropy decoding unit is further configured to obtain, from the video signal, transform coefficient information of a second sub-block based on the second information of the second sub-block having the value of 1, and
wherein the inverse-transform unit is further configured to perform an inverse-transform operation on the obtained transform coefficient information of the second block.

14. The apparatus according to claim 13, wherein the video signal does not contain additional information for the second sub-block based on the second information of the second sub-block having a value of 0.

15. The apparatus according to claim 10, wherein the chrominance block is partitioned into the plurality of sub-blocks based on a transform block unit for performing the inverse-transform operation.

16. The apparatus according to claim 10, wherein the chrominance block contains a Cb or Cr signal.

17. The apparatus according to claim 10, wherein the chrominance block has a size of 16×16 and each of the plurality of sub-blocks has a size of 8×8.

18. The apparatus according to claim 10, wherein the chrominance block has a size of 8×8 and each of the plurality of sub-blocks has a size of 4×4.

* * * * *